US008282694B2

United States Patent
Hitchingham et al.

(10) Patent No.: US 8,282,694 B2
(45) Date of Patent: Oct. 9, 2012

(54) PRETREATMENT OF BIOMASS FEED FOR GASIFICATION

(75) Inventors: Jacqueline Hitchingham, Anoka, MN (US); Lloyd R White, Minneapolis, MN (US)

(73) Assignee: Syngas Technology Inc., Elk River, MN (US)

( * ) Notice: Subject to any disclaimer, the term of this patent is extended or adjusted under 35 U.S.C. 154(b) by 197 days.

(21) Appl. No.: 12/825,887

(22) Filed: Jun. 29, 2010

(65) Prior Publication Data

US 2011/0173888 A1 Jul. 21, 2011

Related U.S. Application Data

(60) Provisional application No. 61/295,358, filed on Jan. 15, 2010.

(51) Int. Cl.
*C10J 3/00* (2006.01)
(52) U.S. Cl. ..................... 48/209; 48/197 FM
(58) Field of Classification Search .................. None
See application file for complete search history.

(56) References Cited

U.S. PATENT DOCUMENTS

| | | | | |
|---|---|---|---|---|
| 3,855,071 | A * | 12/1974 | Koppelman | 202/121 |
| 2010/0120128 | A1* | 5/2010 | Liang | 435/266 |
| 2010/0251616 | A1* | 10/2010 | Paoluccio et al. | 48/197 R |
| 2011/0219679 | A1* | 9/2011 | Budarin et al. | 44/605 |

* cited by examiner

*Primary Examiner* — Imran Akram
(74) *Attorney, Agent, or Firm* — Henry E. Naylor

(57) ABSTRACT

A pretreatment process of a biomass feedstock for gasification for the production of syngas. The biomass feed, which is preferably a cellulosic feed, is subjected to a two stage torrefaction that comminutes the biomass and increases its energy density.

14 Claims, 1 Drawing Sheet

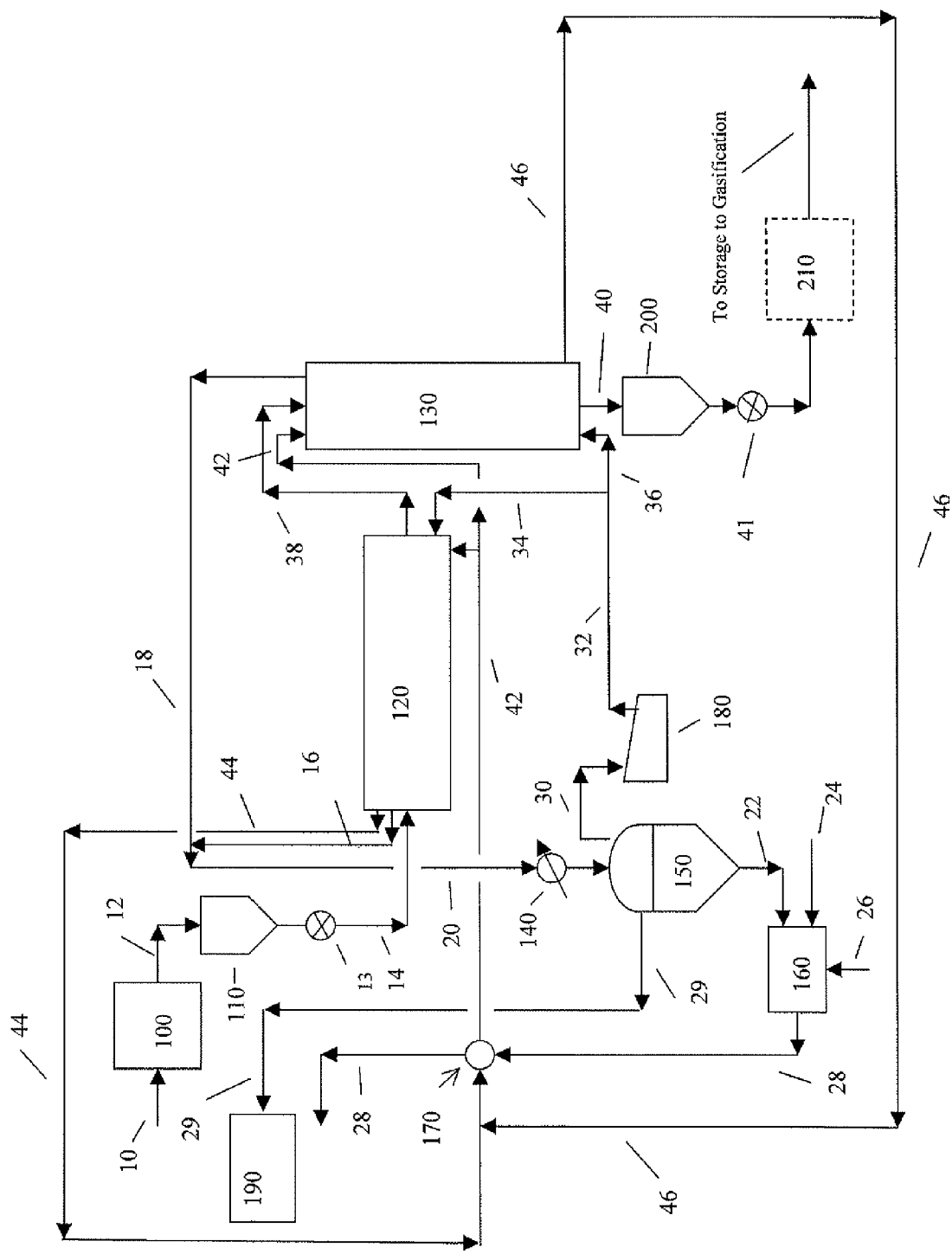

PRETREATMENT OF BIOMASS FEED FOR GASIFICATION

CROSS-REFERENCE TO RELATED APPLICATIONS

This application is based on Provisional Application U.S. Ser. No. 61/295,358 filed Jan. 15, 2010.

FIELD OF THE INVENTION

The present invention relates to a pretreatment process of a biomass feedstock for gasification for the production of syngas. The biomass feed, which is preferably a cellulosic feed, is subjected to a two stage torrefaction that comminutes the biomass and increases its energy density.

BACKGROUND OF THE INVENTION

A substantial amount of research and development is being done to reduce our dependency on petroleum-based energy and to move us toward more sustainable energy sources, such as wind energy, solar energy, and biomass. Of these three sustainable energy sources, biomass is receiving the most attention. One reason for this is because biomass is widely available in a wide variety of forms. Also, the economy of agricultural regions growing crops can greatly benefit from biomass to transportation fuel plants. Thus, governmental bodies in agricultural regions are very supportive of proposed biomass plants. In order to convert biomass to high value products, such as transportation fuels, it typically must first be converted to a syngas by gasification. Biomass gasification is a well-known process for producing synthesis gas (syngas), which is a gas mixture containing varying amounts of carbon monoxide and hydrogen as the major components.

Various types of gasifier designs are known. The most common type of gasifier used in biomass gasification is believed to be an up-draft design (counter-current) design, in which air, oxygen and/or steam flows upward through a permeable bed of biomass and counter-currently to the flow of ash and other byproducts of the reaction. Typical up-draft gasifiers have significant technical shortcomings. First, the introduction of air into the hot gasification chamber partly combusts the biomass, yielding a lower overall heating value compared to gasifiers that employ indirect heating. Second, if air is used as the gasification agent, nitrogen in the air is a diluent that reduces the energy content per unit volume of the output gas, making the output gas less useful in gas turbines, for storage, and for subsequent chemical processing. Third, tars and phenolic hydrocarbons produced in an up-draft gasifier require removal to reduce emissions, avoid fouling of a gas turbine, and avoid catalyst poisoning when used to create liquid fuels. The removal equipment adds to system complexity and size, with the result that for economic reasons the gasifier is usually limited to large installations. Because biomass is a low-energy content fuel and is dispersed geographically, a large-scale gasifier requires transport and storage of the biomass, which negatively affects the economic payback for the system.

In view of the above, there is a need for biomass gasification processes and equipment that are economically practical for use at medium- to small-scale installations, including direct sources of biomass such as agricultural operations (for example, farms), factories in which biomass materials are starting materials and/or byproducts (for example, paper mills, ethanol plants, etc.), bioplants, and small towns and villages. There is also a need for biomass pretreatment processes that result in a more efficient and economical feed to a gasifier. One such pretreatment is torrefaction. Torrefaction is a mild pretreatment of biomass at a temperature from about 200° C. to about 350° C. The properties of the biomass are changed to increase its heating value, reduce its tendency to degrade during storage, and make it easier to mill. Conventional torrefaction processes are used to produce a densified product that can be used in place of or in conjunction with coal.

While both torrefaction and gasification of biomass are well known, there is still a need in the art for processes combining these two technologies that can lead to a more economical biomass to transportation fuel product.

SUMMARY OF THE INVENTION

In accordance with the present invention there is provided a process for preparing a biomass feedstream for gasification, which process comprises:

a) comminuting a moisture-containing lignocellulosic biomass feedsteam to an effective particle size;

b) passing said comminuted lignocellulosic biomass feedstream to a first stage torrefaction containing a torrefaction reactor wherein the biomass is torrefied at a temperature from about 200° C. to about 350° C. in a substantially non-oxidizing environment and for an effective residence time to result in at least about 90 wt. % of the moisture, based on the total amount of moisture, of said biomass being removed and wherein a torrefied biomass feedstream and a first vapor phase product stream are produced;

c) passing said torrefied biomass stream from said first stage torrefaction zone to a second stage torrefaction where it is subjected to temperatures from about 200° C. to about 350° C., in a substantially non-oxidizing environment and at an effective residence time, thereby resulting in a second vapor phase product stream and a particulate biomass stream having an average particle size from about 1 to 500 microns;

d) passing at least a portion of said particulate biomass stream from said second torrefaction zone to a gasification zone;

e) conducting said first and second vapor phase streams to a condensing zone wherein a fraction of both of said vapor phase streams condenses to form a condensate liquid stream comprised of a water component and a hydrocarbon component and a remaining uncondensed vapor phase stream;

f) conducting an effective amount of said uncondensed vapor stream to both first and second torrefaction zones where it acts as a sweep gas to sweep vapor phase products from each torrefaction zone;

g) conducting any remaining portion of said vapor phase stream to a flare or other combustion device h) vaporizing said condensate liquid stream in a burner thereby resulting in a hot flue gas;

i) passing said hot flue gas through a first passageway of a heat exchanger having a first passageway and a second passageway contiguous to each other but not in fluid communication with each other, wherein each of said passageways having an inlet and an outlet and wherein each passageway is constructed to allow a fluid to pass from its inlet to its outlet and to allow heat to be transferred from a fluid of one passageway to a fluid in the other passageway;

i) passing a heat transfer medium through said second passageway of said heat exchanger wherein heat is transferred from said hot flue gas passing through said first passageway of said heat exchange thereby resulting in a heated heat transfer medium;

j) venting said flue gas exiting said heat exchanger;

k) passing said heat transfer medium to said first and second torrefaction zones thereby providing at least a fraction of the heat of reaction for each torrefaction zone.

BRIEF DESCRIPTION OF THE FIGURE

The sole FIGURE hereof is a simplified flow diagram of one preferred embodiment for practicing the present invention.

DETAILED DESCRIPTION OF THE INVENTION

The present invention relates to the preparation of a biomass, preferably a cellulosic-based biomass, as a feed to a gasifier for the production of a syngas. The term "biomass" as used herein is intended to refer to any non-fossilized, i.e., renewable organic matter collected for use as a source of energy. The term "plant biomass" or "ligno-cellulosic biomass" as used herein is intended to refer to virtually any plant-derived organic matter (woody and non-woody) available for energy on a sustainable basis. Plant biomass can include, but is not limited to, agricultural crops, such as corn, and agricultural crop wastes and residues, such as corn stover, corn cobs, alfalfa stems, wheat straw, rice straw, rice hulls, kennaf, distiller's grains, sugar cane bagasse, sugar beet tailings or waste, and the like. Plant biomass further includes cellulosic based materials such as woody energy crops, wood wastes such as old railroad ties, and residues such as trees, softwood forest thinnings, barky wastes, sawdust, paper and pulp industry waste streams, wood fiber, and the like. Additionally, grass crops such as switch grass or mixed prairie grasses and the like have potential to be produced large-scale as another plant biomass source. For urban areas, the best potential plant biomass feedstock comprises yard waste (e.g., grass clippings, leaves, tree clippings, brush, etc.) and vegetable processing waste.

The biomass is prepared first by size reduction followed by torrefaction which increases its carbon content, reduces oxygen content, and eliminates storage hygroscopicity and degradation. Torrefaction increases energy density of cellulosic materials by decomposing the reactive hemi cellulose fraction of the material. Thus, the energy content per unit mass of torrefied product is increased. Much of the energy lost during torrefaction is in an off-gas (tor-gas) that contains combustibles, which can be burned to provide some, if not all, of the heat required by the torrefaction process.

Torrefaction of biomass of the present invention is conducted at temperatures from about 200° C. to 350° C., preferably from about 225° C. to about 320° C., more preferably from about 250° C. to about 300° C. During torrefaction, properties of the biomass are changed which result in better fuel quality for combustion and gasification applications. Typically, torrefaction is followed by pelletizing to yield a product that is suitable as a fuel substitute for coal. In this case, the torrefied biomass of the present invention is not densified, but is instead reduced to a particle size that will be suitable for use in a fluid-bed gasifier. In the torrefaction of the present invention, the hemicelluloses, and depending on severity, some of the cellulose in the biomass undergoes hydrolysis and dehydration reactions. The process primarily removes $CH_3O-$, $HCOO-$, $CH_3COO-$ functional groups from the hemicellulose. Hydrolysis reactions also cleave the C—O—C linkages in the polymeric chains that comprise the major constituents in the biomass. The acidic components in the resulting vapor phase products have the potential to catalyze these reactions. The terms "vapor phase products" and "tor-gas" are used interchangeably herein. The torrefaction process produces a solid product having higher energy density than the feedstock and a tor-gas. Particle size reduction occurs during the second stage of the torrefaction process as a result of both chemical action that makes the material friable and mechanical action of either jet milling or vigorous fluidization. Overall, the process uses less electrical power to achieve a desired degree of size reduction.

Further, torrefaction converts a wide array of cellulosic biomass into particulate matter having similar properties. If desired, the severity of the torrefaction process can be altered to produce a torrefied product having the same energy content as that produced from a completely different biomass feedstock. This has implicit advantages in the design of the gasifier feed system and greatly simplifies gasifier operation with respect to controlling the $H_2/CO$ ratio in the syngas product. In addition, by selectively removing carboxylates in the torrefaction unit, it is believed that less methane will be produced as a result of decarboxylation and fewer tars will be formed during gasification by reactions between aldehydes produced from carboxylic acids and phenols derived from lignin.

The present invention will be better understood with reference to the FIGURE hereof. This FIGURE is a simple block diagram representation of a preferred mode for practicing the present invention. A biomass, preferably a cellulosic biomass, feedstock is fed via line 10 to milling zone 100 where it is reduced to a particle size of about 0.25 to about 3 inches, preferably from about 0.5 to 1.5 inches. The fibrous structure of the biomass makes it very difficult and costly to reduce its particle size. Non-limiting examples of mechanical size reduction equipment that can be used in milling zone 100 include rotary breakers, roll crushers, hammermills, impactors, tumbling mills, roller mills, shear grinders, and knife mills. Hammermills are preferred for the practice of the present invention. The biomass feedstock, now of reduced size, is passed via line 12 to feed bin 110 where it is held until being passed through first metering valve 13 and then via line 14 to first torrefaction zone 120, which is primarily a reaction vessel. The torrefaction zone is operated in a non-oxidizing atmosphere and at a temperature from about 200° C. to about 350° C., preferably from about 225° to about 320° C., and more preferably at a temperature of about 250° to about 300° C. Total residence time in both torrefaction reactors will be an effective residence time. By "effective residence time" we mean a residence time that will allow for removing at least about 90 wt. %, preferably at least about 95 wt. %, more preferably at least about 98 wt. %, and most preferably substantially all of the free moisture from the biomass. Typically this effective residence time will be from about 10 to about 60 minutes, preferably from about 30 to about 60 minutes with lower temperatures requiring longer times. The residence time of the biomass in the first as well as the second torrefaction stage will be in the same range, but not necessarily at the identical residence times. The choice of time/temperature combination is affected by competing requirements; higher temperatures reduce residence time and lead to smaller reactors. But if the temperature is too high, torrefaction reactions can become exothermic and can even cause a runaway reaction. Hence, the time/temperature combination must be set carefully. It is preferred that the residence time be from about 10 to about 30 minutes. Substantially all of the moisture is preferably driven off during the initial stage of torrefaction followed by the formation of reaction products that primarily comprise the vapor phase product.

A vapor phase product and torrefied feed solids are produced in both torrefaction zones 120 and 130. The tor-gas from each torrefaction zone will typically be comprised of water vapor, methane, methanol, acetol, CO, $CO_2$, furfural, and low carbon organic acids such as formic acid, acetic acid, and lactic acid. The tor-gas exits first torrefaction zone 120 via line 16 along with a sweep gas and is combined with tor-gas via line 18 from second torrefaction zone 130. The combined gaseous stream is then passed via line 20 through condensing zone 140 wherein a fraction of the vapor phase products is condensed to a liquid. The effluent stream from condensing zone 140 is conducted to flash drum 150, which can also be referred to as a knockout drum where the condensate stream is separated from the vapor phase and passed via line 22, along with additional fuel via line 24 and air via line 26 to burner 160 where the condensate is burned to produce a hot flue gas that is vented via line 28. The hot flue gas in line 28 passes through a first passageway of a heat exchanger 170 wherein it transfers heat to a heat transfer medium passing through the other passageway and conducted via lines 42, 44, and 46 to both torrefaction zones and back to the heat exchanger. Any suitable heat transfer medium can be used as long as it is capable of being heated to a temperature in the range of about 200° C. to about 350° C. without being decomposed and creating excessive pressure in the system. Such heat transfer mediums are well known in the art and a detailed description of such is not required herein. The heat transfer medium will typically be an oil-based heat transfer medium. The condensate will be primarily comprised of water and methanol, and to a lesser extent an organic acid component. The vapor phase fraction from knockout drum 150 will be comprised primarily of CO and $CO_2$.

An effective amount of the vapor phase fraction from knockout drum 150 will be conducted via line 30 to blower 180 where it is conducted as a sweep gas via lines 32 and 34 to first torrefaction zone 120 and via lines 32 and 36 to second torrefaction zone 130. By effective amount we mean that amount needed that would be effective for sweeping the tor-refaction zones of tor-gas product. Any excess vapor phase fraction from knockout drum 150 is purged via line 29 to downstream processing, preferably to a flare 190.

Torrefied solids, which will now be further reduced in size, are passed from first torrefaction zone 120 via line 38 to second torrefaction reactor 130. The reduced size will be from about 1 to 500 microns, preferably about 1 to 300 microns, more preferably about 50 to 200 microns, and most preferably from about 50 to about 100 microns, which are sauter-mean diameters. Second torrefaction reactor 130 will also be operated in a non-oxidizing atmosphere and at a temperature from about 200° C. to about 350° C., preferably from about 225° to about 320° C., and more preferably at a temperature of about 250° to about 300° C.

Any type of torrefaction reactor can be used in the practice of the present invention for both torrefaction zones. Non-limiting types of torrefaction reactors that can be used herein are continuous reactors that include horizontal moving bed reactors, fluid bed reactors, and jet mill reactors. It is preferred that the reactor used in first torrefaction zone be a horizontal moving bed reactor having an outer jacket wherein an oil-based heat transfer medium is conducted to provide at least a fraction of the heat of reaction for the reactor. It is preferred that the reactor used in the second torrefaction zone be a fluid bed reactor since the biomass solids exiting the first torrefaction reactor will be more friable than the initial biomass feed entering the first torrefaction reactor and will be broken into smaller particles quickly in the second torrefaction reactor. This reduced size once torrefied biomass feed will most likely be in a particle size range suitable for a fluid bed gasifier. If a fluid bed torrefaction reactor were to be used in the first torrefaction zone then reducing the size of the biomass feed to fluidization size would be required upstream of it. This would be too cost restrictive using conventional size reduction devices, such as hammer mills. If a fluid bed torrefaction reactor is used in the second torrefaction zone then a cyclone will be used to separate fines from the product vapor phase stream which is passed via line 18 to knockout drum 150. The separated fines will be returned to the fluid bed.

The final torrefied biomass solids exit second torrefaction reactor 130 via line 40 and are passed to torrefied biomass bin 200 where they are metered via second metering valve 41 to storage or directly to a gasification unit (not shown) for the production of syngas. An optional milling step 210 can be used in the event the particle size of the torrefied biomass exiting second torrefaction reactor 130 is too large for the intended gasifier. Any suitable milling apparatus can be used to reduce the size to a fluid gasification size.

It will be understood that a jet mill torrefaction reactor can be used as the second torrefaction reactor. If a jet mill torrefaction reactor is used then there will be no need for a milling step prior to gasification since the particle size of the biomass exiting a jet mill reactor will be well within the acceptable particle size for fluid bed gasification.

What is claimed is:

1. A process for preparing a biomass feedstream for gasification comprising:
   a) comminuting a moisture-containing lignocellulosic biomass feedstream to an effective particle size;
   b) passing said comminuted lignocellulosic biomass feedstream to a first stage torrefaction containing a first continuous torrefaction reactor having a first outer jacket through which an oil-based heat transfer fluid is conducted to provide heat to the first reactor and wherein the biomass is torrefied at a temperature from about 200° C. to about 350° C. in a substantially non-oxidizing environment and for an effective residence time to result in at least about 90 wt. % of the moisture, based on the total amount of moisture, of said biomass being removed and wherein a torrefied biomass feedstream and a first vapor phase product stream are produced;
   e) passing said torrefied biomass stream from said first torrefaction reactor to a second stage torrefaction containing a second continous torrefaction reactor having a second outer jacket through which an oil-based heat transfer fluid is conducted to provide heat to the second reactor and where the torrefied biomass is subjected to temperatures from about 200° C. to about 350° C., in a substantially non-oxidizing environment and at an effective residence time, to result in a second vapor phase product stream and a particulate biomass stream having an average particle size from about 1 to 500 microns;
   d) passing at least a portion of said particulate biomass stream from said second torrefaction reactor to a gasification zone;
   e) conducting said first and second vapor phase streams to a condensing zone wherein a fraction of both of said vapor phase streams condenses to form a condensate liquid stream comprised of a water component and a hydrocarbon component and a remaining uncondensed vapor phase stream;
   f) conducting an effective amount of said uncondensed vapor stream to both first and second torrefaction reactors to sweep vapor phase products from each torrefaction reactor;
   g) conducting any remaining portion of said vapor phase stream to a flare;

h) vaporizing said condensate liquid stream in a burner thereby resulting in a hot flue gas;

i) passing said hot flue gas through a first passageway of a heat exchanger having a first passageway and a second passageway contiguous to each other but not in fluid communication with each other, wherein each of said passageways having an inlet and an outlet and wherein each passageway is constructed to allow a fluid to pass from its inlet to its outlet and to allow heat to be transferred from a fluid of one passageway to a fluid in the other passageway;

i) passing a heat transfer medium through said second passageway of said heat exchanger wherein heat is transferred from said hot flue gas passing through said first passageway of said heat exchange thereby resulting in a heated heat transfer medium;

j) venting said flue gas exiting said heat exchanger;

k) passing said heat transfer medium to the outer jackets of the first and second torrefaction reactors thereby providing at least a fraction of the heat of reaction for each torrefaction reactor, wherein said heat transfer medium is not in direct contact with said biomass in either torrefaction reactors.

2. The process of claim 1 wherein the lignocellulosic biomass is selected from the group consisting of corn, corn stover, corn cobs, alfalfa stems, wheat straw, rice straw, rice hulls, kennaf, distiller's grains, sugar cane bagasse, sugar beet tailings wood wastes, railroad ties, trees, softwood forest thinnings, barky wastes, sawdust, paper, wood fiber, grass crops, grass clippings, tree clippings and the like.

3. The process of claim 2 wherein the lignocellulosic biomass is selected from sugar can bagasse and sugar beet tailings.

4. The process of claim 1 wherein the temperature of the first stage torrefaction is from about 225° C. to about 320° C.

5. The process of claim 1 wherein the temperature of the second stage torrefaction is from about 225° C. to about 320° C.

6. The process of claim 1 wherein at least about 98 wt. % of the moisture is removed from the biomass in said first torrefaction stage.

7. The process of claim 6 wherein substantially all of the moisture is removed from the biomass in said first torrefaction stage.

8. The process of claim 1 wherein the residence time of the biomass in the first and the second torrefaction stage is from about 10 to 60 minutes.

9. The process of claim 1 wherein the residence time of the biomass in the first and the second torrefaction stage is from about 10 to 30 minutes.

10. The process of claim 1 wherein the reactors of the first torrefaction stage and the second torrefaction stage are independently selected from the group consisting of horizontal moving bed reactors, fluid bed reactors and jet mill reactors.

11. The process of claim 1 wherein the torrefaction reactors for both first stage torrefaction and second stage torrefaction are horizontal moving bed reactors.

12. The process of claim 1 wherein the gasification zone is a fluid bed gasification zone.

13. The process of claim 1 wherein the continuous torrefaction reactor is selected from the group consisting of horizontal moving bed reactors, fluid be reactors, and jet mill reactors.

14. The process of claim 13 wherein the continuous torrefaction reactor is a horizontal moving bed reactor.

* * * * *